United States Patent
Takagi et al.

(10) Patent No.: US 7,080,860 B2
(45) Date of Patent: *Jul. 25, 2006

(54) FASTENING STRUCTURE FOR END OF HOSE WITH CORRUGATED METAL TUBE

(75) Inventors: Yuji Takagi, Aichi-ken (JP); Norihiko Furuta, Aichi-ken (JP); Tomohide Ito, Aichi-ken (JP)

(73) Assignee: Tokai Rubber Industries, Ltd. (JP)

( * ) Notice: Subject to any disclaimer, the term of this patent is extended or adjusted under 35 U.S.C. 154(b) by 80 days.

This patent is subject to a terminal disclaimer.

(21) Appl. No.: 10/619,897

(22) Filed: Jul. 15, 2003

(65) Prior Publication Data

US 2004/0020545 A1 Feb. 5, 2004

(30) Foreign Application Priority Data

Jul. 16, 2002 (JP) ............................. 2002-207373
Jul. 30, 2002 (JP) ............................. 2002-221894

(51) Int. Cl.
*F16L 33/00* (2006.01)

(52) U.S. Cl. .................. 285/256; 285/114; 285/222.1; 285/222.2; 285/242; 285/259; 285/382; 285/903

(58) Field of Classification Search ................ 285/242, 285/255, 256, 259, 903, 222.1, 222.2, 114, 285/115, 382; 29/508, 516
See application file for complete search history.

(56) References Cited

U.S. PATENT DOCUMENTS

| | | | | |
|---|---|---|---|---|
| 2,040,834 A | * | 5/1936 | Cowles | 285/256 |
| 2,309,719 A | * | 1/1943 | Locke | 285/222.5 |
| 2,848,254 A | * | 8/1958 | Millar | 285/222.5 |
| 2,858,147 A | * | 10/1958 | Guarnaschelli | 285/222.5 |
| 3,381,981 A | * | 5/1968 | Wilson | 285/222.4 |
| 3,540,486 A | * | 11/1970 | Flounders | 285/256 |
| 3,951,438 A | * | 4/1976 | Scales | 285/55 |
| 4,729,583 A | * | 3/1988 | Lalikos et al. | 285/222.1 |
| 5,297,337 A | * | 3/1994 | Igarashi et al. | 29/890.144 |
| 5,332,269 A | * | 7/1994 | Homm | 285/39 |
| 5,398,977 A | * | 3/1995 | Berger et al. | 285/123.17 |
| 5,404,632 A | * | 4/1995 | Zaborszki | 29/508 |
| 5,413,147 A | * | 5/1995 | Moreiras et al. | 138/109 |
| 5,911,448 A | * | 6/1999 | Feher | 285/222.5 |
| 6,354,332 B1 | | 3/2002 | Burkhardt et al. | |
| 6,386,594 B1 | * | 5/2002 | Schuttler et al. | 285/251 |
| 6,764,106 B1 | * | 7/2004 | Smith et al. | 285/256 |
| 2002/0007860 A1 | | 1/2002 | Katayama et al. | |
| 2003/0205898 A1 | * | 11/2003 | Baldwin et al. | 285/256 |
| 2004/0094953 A1 | * | 5/2004 | Luft et al. | 285/256 |

FOREIGN PATENT DOCUMENTS

| JP | 51-150511 | 12/1976 |
|---|---|---|
| JP | 0182872 A2 | 12/1998 |

* cited by examiner

*Primary Examiner*—James M. Hewitt
(74) *Attorney, Agent, or Firm*—Andrus, Sceales, Starke & Sawall, LLP

(57) ABSTRACT

In a hose with a corrugated metal tube, an axial leading end portion of the corrugated metal tube is configured as an extending portion so as to extend in an axial direction beyond a base portion of a socket fitting and be exposed out of an outer layer of the hose. The extending portion is clamped by an inner end surface of the base portion and an outer surface of a rigid insert pipe.

14 Claims, 12 Drawing Sheets

(A)

(B)

(C)

(A)

(B)

(C)

(A)

(B)

FASTENING STRUCTURE FOR END OF HOSE WITH CORRUGATED METAL TUBE

BACKGROUND OF THE INVENTION

The present invention relates to a hose with corrugated metal tube, which is suitable for fuel conveying hose for automobiles, refrigerant conveying hose or any other fluid conveying hose, and more particularly to fastening structure assembled on an end portion thereof.

Typical rubber hoses, for example, made of blended product of acrylonitrile-butadiene rubber and polyvinyl chloride (NBR/PVC blend) which is excellent in resistance to gasoline permeability, have been used for conveying fuel for automobiles or the like in view of their high vibration-absorbability, easy assembling or the like. However, for the purpose of global environment protection, the regulations have been recently tighten against permeation of fuel for automobiles or the like, and are anticipated to be further tighten in the future. Further, hoses are demanded to meet the requirements to convey highly permeable fluid such as hydrogen gas used in fuel cells or carbon dioxide ($CO_2$) refrigerant.

Then it is anticipated difficult to satisfy the future requirements with hoses made only of organic materials such as rubber or resin.

Accordingly, it is currently considered to adapt a hose with a corrugated metal tube as an inner layer because the hose with a corrugated metal tube is expected to have an extremely high fluid impermeability to meet the demand for a fluid impermeable hose.

As for hose with corrugated metal tube, such hoses as disclosed in the following Document 1, Document 2 and Document 3 are known.

Document 1 JP, A, 2001-182872
Document 2 US20020007860A1
Document 3 JP, U, 51-150511

In case of the hose with corrugated metal tube, even if adapted for hydrogen gas of small molecular mass used for fuel cells, a corrugated metal tube in or as an inner layer reduces gas permeation zero, i.e., completely eliminates perm ation of gas.

However, as an inner layer, i.e., a corrugated metal tube in the hose with corrugated metal tube is difficult to deform, if the hose with corrugated metal tube is adapted, it will be a problem how to construct fastening structure on an end portion of the hose with corrugated metal tube so as to assure sealing property thereon.

Up to now, as shown in FIG. 11, fastening structure for typical rubber hose is usually constructed as in following manner. First, a rigid metal inert pipe or connecting part 200 is inserted in a hose body 202, a socket fitting 204 including an inwardly directed collar-like base portion 206 is fitted onto the hose body 202. And then, the socket fitting 204 or a sleeve thereof is securely compressed or swaged radially inwardly to the hose body 202. The hose body 202, the insert pipe 200 and the socket fitting 204 are securely fastened in unitary relation with one another by securely compressing or swaging the socket fitting 204 or the sleeve thereof radially inwardly to the hose body 202 and a seal is thereby provided between an inner surface of the hose body 202 and the insert pipe 200.

And, fastening structure as shown in FIG. 12 is basically same as the one as shown in FIG. 11. In this fastening structure, a hose body 208 has multi-layers, an inner rubber layer (inner elastic layer) 210, a reinforced layer 212 and an outer rubber layer (outer elastic layer) 214. A metal insert pipe or pipe-shaped connecting part 216 is inserted in the hose body 208, and a socket fitting 218 is fitted onto the hose body 208. A socket fitting 218 includes a sleeve 220 and an inwardly directed collar-like base portion 222. The socket fitting 218 is securely compressed or swaged radially inwardly. Thereby the hose body 208 is, along with the socket fitting 218, fixedly secured to the connecting part 216. A reference S in FIG. 12 indicates a gap defined in a tip-end side of the hose body 208.

Though an end portion of the hose body 208 is fixedly secured to the connecting part 216 by securely compressing or swaging the socket fitting 218, the outer rubber layer 214 may be cut away on a portion on which the socket fitting 218 is fitted so as to expose the reinforced layer 212 partly, the socket fitting 218 may be fitted onto the reinforced layer 212 exposed, and the socket fitting 218 may be securely compressed or swaged radially inwardly to the reinforced layer 212.

The reason is that if the outer rubber layer 214 remains uncut while socket fitting 218 is fitted onto an outer side thereof and the socket fitting 218 is securely compressed and swaged radially inwardly, a fastening force applied by the socket fitting 218 may be not exerted sufficiently to an end portion of the hose body 208 due to elasticity of the outer rubber layer 214 and pull-out resistance of the hose body 208 is decreased.

In such fastening structure or sealing structure assembled on an end portion of the typical conventional hoses as shown in FIGS. 11 and 12, an end portion of the hose body 202, 208 may be favorably sealed just by securely compressing or swaging the socket fitting 204, 218, as an inner surface of the inner rubber layer 210 (in FIG. 12) can sufficiently closely contacts with an outer surface of the insert pipe or connecting part 200, 216 thanks to elasticity thereof.

However, in case of a hose with corrugated metal tube in or as an inner layer, close-contact relation is hardly obtained between the corrugated metal tube and the insert pipe or the connecting part. If there is a scratch on a surface of the corrugated metal tube in a compressed or swaged range, internal fluid easily leaks out of that scratch.

Therefore, in such a hose with corrugated metal tube, a tip end of the corrugated metal tube is bonded to the insert pipe or connecting part by welding to assure sealing property therebetween.

However, a great deal of difficulties is presented in welding operation for sealing an end portion of the hose. It not only raises production cost of a hose, but also lowers mechanical strength of an insert pipe or a corrugated metal tube due to affection by heat and thereby will be a factor to damage quality assurance of a hose.

Some problems are explained as above, specifically with an example of a hose conveying hydrogen gas used in fuel cells. However, these problems will arise in common in case that a hose with corrugated metal tube is adapted for conveying refrigerant of small molecular mass such as $CO_2$ which is high in gas permeability or other fluid, or a hose with corrugated metal tube is adapted in fields under severe regulations against gas permeation, for example, for conveying automobile fuel or the like.

Accordingly, it is an object of the present invention to provide fastening structure assembled on an end of a hose with corrugated metal tube having sufficient sealing property or sufficient sealing property and mechanical strength.

SUMMARY OF THE INVENTION

In order to achieve a foregoing object, there is provided a novel fastening structure assembled on an end portion of a hose with corrugated metal tube (for example, annularly corrugated metal tube).

According to the present invention, a fastening structure for securely fastening an axial end portion of a hose body, a rigid insert pipe and a socket fitting, for example, with one another, in unitary relation, comprises a hose body constructed in multi-layers having a corrugated metal tube in or as an inner layer and an outer layer including an elastic layer circumscribing a radial outer side thereof, a rigid insert pipe inserted in an axial end portion of the hose body, and a socket fitting fitted on or onto an outer surface of the hose body at an axial end portion thereof, and compressed or swaged radially inwardly to be secured to an axial end portion of the hose body in which the rigid insert pipe is inserted. The socket fitting has an inwardly directed collar-like base portion, for example, at a base portion of a sleeve of the socket fitting. An axial leading portion of the corrugated metal tube is configured as an extending portion extending and exposed out of the outer layer (of single layer or multi-layer construction) of the hose body, and extending at least to a position of a tip end of the inwardly directed collar-like base portion. Thus construction enables the extending portion of the corrugated metal tube to be clamped in between an inner end surface of the inwardly directed collar-like base portion of the socket fitting and an outer surface of the insert pipe when securely compressing or swaging the socket fitting radially inwardly.

The extending portion of the corrugated metal tube may be formed in non-corrugated and generally axially straight-walled shape or generally axially straight shape. The extending portion preferably extends axially outwardly, beyond the inwardly directed collar-like base portion of the socket fitting. Thanks to such configuration, it becomes possible that the extending portion is clamped in between the base portion of the socket fitting and the insert pipe more securely and firmly.

In this instance, the socket fitting is securely compressed or swaged, and thereby the hose body, the insert pipe and the socket fitting are fastened in unitary relation while the extending portion is clamped in between an inner end surface of the inwardly directed collar-like base portion of the socket fitting and an outer surface of the insert pipe, and a tight seal is provided between the corrugated metal tube and the insert pipe. Therefore, just by swaging operation of the socket fitting, not by welding operation as in the past, fastening and sealing structure is constructed on an end portion of the hose. Accordingly, a hose of which end portion is fixedly fastened and sealed may be manufactured at low cost, and it may be prevented that mechanical strength is decreased in the insert pipe or the corrugated metal tube as a result of welding operation. That is, quality assurance is enhanced with respect to an end portion of the hose.

A radial groove may be formed on either one of an outer surface of the rigid insert pipe or an inner end surface of the base portion of the socket fitting while a fit-in portion may be formed on the other to fit in the radial groove. In this instance, the extending portion of the corrugated metal tube may be clamped in between the fit-in portion and the radial groove. In this construction, securing property is further enhanced, and sealing property is enhanced as well.

The fit-in portion may be formed by plastic deformation along or corresponding to the radial groove when securely compressing or swaging the socket fitting to an axial end portion of the hose body. The fit-in portion fits in the radial groove in engagement relation via the extending portion. The extending portion is clamped in between the fit-in portion and the radial groove at a bottom surface and axial front and rear side surfaces of the radial groove. Securing force and sealing property may be further enhanced in this construction.

The radial groove may be formed on an outer surface of the insert pipe, and the fit-in portion may be formed on a radially inner end portion of the base portion formed in the socket fitting. In this construction, a wall thickness of a radially inner end portion of the base portion before securely compressing or swaging the socket fitting may be designed at least larger than a value given by subtracting double of a wall thickness of the extending portion from a width of the radial groove. In such construction, a radially inner end portion of the base portion of the socket fitting may be plastic deformed and fitted or bitten in the radial groove securely at the time of swaging operation.

For forming the fit-in portion by plastic deformation at the time of securely compressing or swaging operation, a portion or side to be formed in the fit-in portion preferably has a lower hardness than a portion or side on which the radial groove is formed.

Whether or not to form the radial groove as above, a small projection raised radially may be formed on either one of an outer surface of the rigid insert pipe or an inner end surface of the base portion of the socket fitting, and a small recess may be formed on the other by plastic deformation under biting of the small projection when securely compressing or swaging the socket fitting to an axial end portion of the hose body. In this state, the extending portion is clamped by the small projection and the small recess. Sealing property on the end portion of the hose is thereby effectively enhanced.

In this construction, the small projection is preferably designed with height smaller than wall thickness of the extending portion of the corrugated metal tube. If the height of the small projection is designed larger than the wall thickness of the extending portion, there is a fear that the extending portion is broken by the small projection when securely compressing or swaging the socket fitting. However, with this configuration or thus configured small projection such inconvenience may be prevented.

Also, according to the present invention, there is provided another fastening structure assembled on an end portion of a hose with corrugated metal tube (for example, annularly corrugated metal tube). This fastening structure may be adapted for securely fastening an axial end portion of a hose body to a connecting part or a rigid insert pipe, or securely fastening an axial end portion of a hose body, an rigid insert pipe and a socket fitting, for example, with one another, in unitary relation. The fastening structure comprises a hose body constructed in multi-layers having a corrugated metal tube as an inner layer and an outer layer, for example, including an elastic layer, circumscribing a radial outer side thereof. An axial end side or an axial leading portion of the corrugated metal tube is configured as an extending portion extending and exposed out of the outer layer (of single layer or multi-layer construction) of the hose body. The fastening structure also comprises a connecting part or a rigid insert pipe inserted in an axial end portion of the hose body and a socket fitting fitted onto an axial end portion of the hose body or on an outer surface of the hose body at an axial end portion thereof, and securely compressed or swaged radially inwardly to an axial end portion of the hose body, or to be secured to an axial end portion of the hose body, for example, in which the rigid insert pipe or the connecting part is inserted. In this manner, the extending portion of the corrugated metal tube is fixedly secured to the connecting part or the rigid insert pipe and thereby an axial end portion of the hose body is fastened to the connecting part or the rigid insert pipe. The socket fitting has a sleeve and a radially inwardly directed collar-like portion formed on a base portion thereof, or has an inwardly directed collar-like portion. The fastening structure further comprises a filler layer interposed in an inner surface side of the socket fitting or the sleeve of the socket fitting, and deformed and moved under fastening force exerted by the socket fitting when securely compressing or swaging the socket fitting. The filler layer is urged in a gap defined on a tip end side of the outer layer, fills in the gap by compressing or swaging the socket fitting and bears from radially outside the extending portion of the corrugated metal tube on which an internal pressure is applied.

In a fastening structure or sealing structure assembled on an end portion of a hose with corrugated metal tube, as shown in FIG. 10, a gap S may be defined on a tip end side of the hose body 226, specifically a tip end side of the reinforced layer 228 and the inner rubber layer 230 when the socket fitting 224 is securely compressed or swaged. For example, when an impulse test to act an internal pressure with high impact to the hose is conducted, a problem may occur that the single-tube layered extending portion of the corrugated metal tube 232 is swollen and burst by internal pressure, and thereby the hose is broken. The reason is that no member exists to bear the extending portion of the corrugated metal tube from radially outside as the extending portion thereof is of single-layered tube, i.e. exposed out of outer layers in the gap S. Then a filler layer is provided to be urged into the gap defined on a tip end side of the outer layers and to fill it in so as to bear from radially outside internal pressure which acts on the extending portion of the corrugated metal tube or the extending portion of the corrugated metal tube on which an internal pressure acts. In configuration in this manner, it is favorably prevented that the extending portion of the corrugated metal tube 232 is swollen or burst in the gap S by internal pressure.

FIG. 10 shows an example where the gap S is defined between the hose body 226, specifically a tip end portion of the inner rubber layer 230 and the reinforced layer 228 and the collar-like portion or the collar-like base portion of the socket fitting 224. The gap S in a tip-end side of the outer layers is not always defined between the hose body 226 and the collar-like base portion 234 of the socket fitting 224 depending on a manner or structure for fixedly securing the hose body 226 with respect to the connecting part or the rigid insert pipe. However, the present invention is specifically suitable to fill in such gap as defined between a tip-end portion of the outer layers and the collar-like portion of the socket fitting.

The outer layer may be in multi-layers, a reinforced layer sectionally midway thereof, and an inner elastic layer and an outer elastic layer are disposed inside and outside of the reinforced layer respectively. In this construction, the filler layer is defined by a part of the outer elastic layer of the outer layer. In some cases, a layer of filling material other than the outer elastic layer may be disposed in inner surface side of the sleeve of the socket fitting.

According to the present invention, an inner diameter of a portion adjacent to the collar-like portion may be smaller than the rest portion of the sleeve of the socket fitting after securely compressing or swaging the socket fitting. In this construction, the filler layer is effectively urged into the gap under compression by the portion of the sleeve with smaller inner diameter and fills in the gap.

In this case, an inner diameter of a portion adjacent to the collar-like portion may be designed smaller prior to securely compressing or swaging operation. Alternatively, an inner diameter of a portion adjacent to the collar-like portion may be identical to that of the rest portion before swaging operation, and the portion adjacent to the collar-like portion may be compressed under higher pressure compared to the rest portion at swaging operation so as to be smaller in inner diameter thereof. Consequently, an inner diameter of the portion adjacent to the collar-like portion becomes smaller compared to that of the rest portion.

According to the present invention, a projection raised radially inwardly may be formed on an inner surface of the socket fitting or the sleeve of the socket fitting so as to bite in the reinforced layer by securely compressing or swaging the socket fitting. This construction enables to favorably exert compressing force which is applied by the socket fitting to the hose body and to enhance pull-out resistance of the hose body with respect to the socket fitting and the connecting part or the rigid insert pipe.

Alternatively, an inwardly directed annular projection may be formed on an inner surface of the socket fitting or the sleeve of the socket fitting on a position near the collar-like portion thereof to restrain the filler layer from deforming and escaping in a direction away from the collar-like portion thereof. By constructing in this manner, the filler layer is preferentially urged in the gap and effectively fill in the gap at the time of securely compressing or swaging operation.

Now, the preferred embodiments of the present invention will be described in detail with reference to the drawings.

DETAILED DESCRIPTIONS OF PREFERRED EMBODIMENTS

Figure 1:
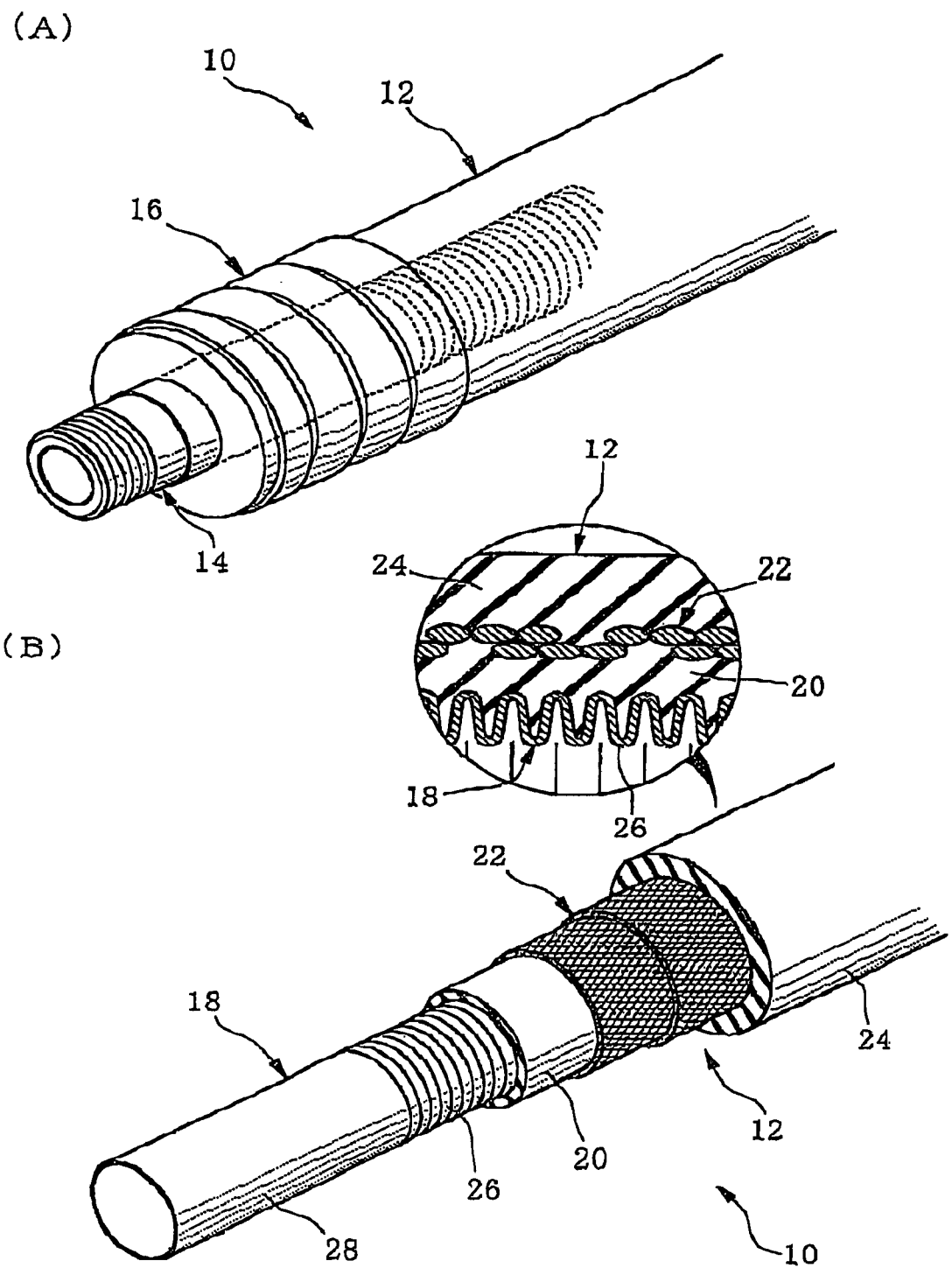
FIG. 1(A) is a perspective view in outline showing a first fastening structure assembled on an end portion of a first hose with corrugated metal tube according to the present invention.
FIG. 1(B) is a perspective view showing multi-layer construction of the first hose.

In FIG. 1, a numeral reference 10 indicates a first hose or first composite hose with corrugated metal tube (hereinafter referred to as a hose) which is preferably adapted for hydrogen or hydrogen gas conveying hose, refrigerant conveying hose for air conditioners or automobile fuel hose. A numeral reference 12 indicates a hose body, a numeral reference 14 a rigid metal insert pipe inserted in the hose body 12, a numeral reference 16 a metal socket fitting fitted onto the hose body 12. The socket fitting 16 is securely compressed or swaged to the hose body 12, thereby an end portion of the hose body 12, the insert pipe 14 and the socket fitting 16 are securely fastened in unitary relation, and a seal is provided therebetween.

Figure 2:
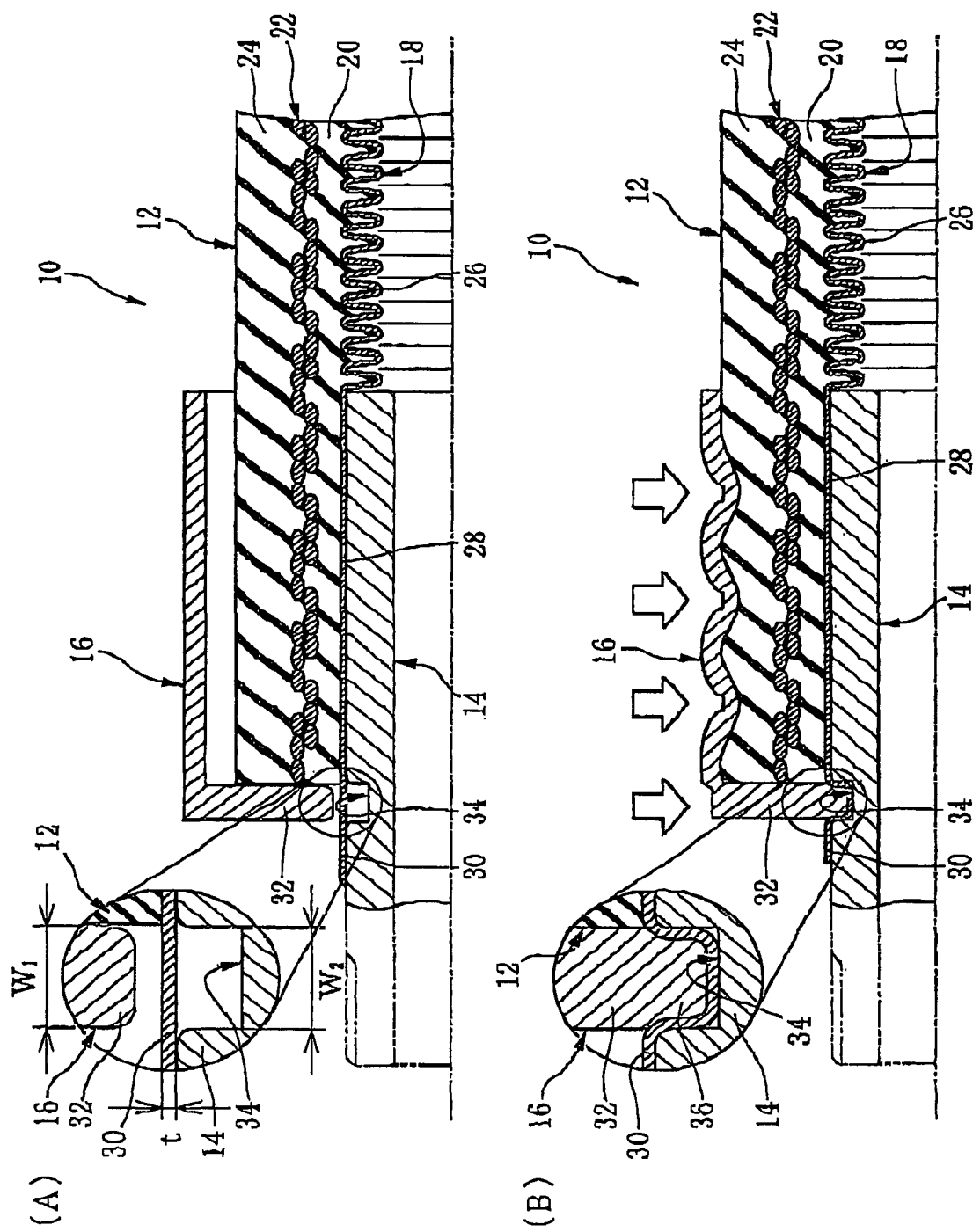
FIG. 2(A) is a cross-sectional view of the first fastening structure before securely compressing or swaging operation of a socket fitting according to the present invention.
FIG. 2(B) is a cross-sectional view of the first fastening structure after securely compressing or swaging operation of the socket fitting according to the present invention.

A first fastening structure and sealing structure assembled on an end portion of the hose 10 is specifically illustrated in FIG. 2.

As shown in FIG. 2, the hose body 12 has multi-layers, a corrugated metal tube 18 made of stainless steel pipe or the like as innermost or inner layer, an inner elastic layer 20, a reinforced layer 22 and an outer elastic layer 24 which circumscribe the corrugated metal tube 18. Each of the layers is fixedly bonded to an adjacent layer into a composite hose by vulcanizing or other manner.

In this instance, the inner elastic layer 20, the reinforced layer 22 and the outer elastic layer 24 construct outer layer circumscribing the corrugated metal tube 18.

The reinforced layer 22 may be a wire-reinforced layer or a fiber-reinforced layer.

And the inner elastic layer 20 may be made of rubber or resin having elasticity or the like. The outer elastic layer 24 may be a layer made of rubber.

On the other hand, the corrugated metal tube 18 as innermost layer is formed with corrugations 26 generally entire axial length thereof, which provides the corrugated metal tube 18 with flexibility.

That is, although, in this embodiment, an innermost layer of the hose 10 includes a metal tube, the hose 10 is provided entirely with flexibility, thanks to the corrugations 26 formed on the metal tube.

The corrugated metal tube 18 has a non-corrugated and axially-straight-walled portion 28, and a portion on an axial leading side thereof is configured as an extending portion 30 which extends and is exposed out of the outer layer comprising the inner elastic layer 20, the reinforced layer 22 and the outer elastic layer 24.

In this embodiment, the extending portion 30 extends axially outwardly out of the outer layer beyond a position or an axial position of corresponding to a tip end of an inwardly directed collar-like base portion 32 of the socket fitting 16. The socket fitting 16 has a sleeve and the collar-like base portion 32 on a base portion of the sleeve.

And, the extending portion 30 is clamped in between an outer surface of the rigid insert pipe 14 and the base portion 32 of the socket fitting 16, and thereby the corrugated metal tube 18 is fixedly secured to the rigid insert pipe 14 and the socket fitting 16.

In this embodiment, the first fastening or securing structure for the end portion of the hose 10 is arranged as follows.

A radial groove 34 of an annular shape is formed in an outer surface of the rigid insert pipe 14 so as to be located corresponding to the base portion 32 of the socket fitting 16, and a fit-in portion 36 of the base portion 32 fits in the radial groove 34 as shown in a fragmentary enlarged view of FIG. 2(B). The extending portion 30 which is clamped by the radial groove 34 and the fit-in portion 36 is deformed in a form of the radial groove 34. The extending portion 30 is clamped under pressure between the fit-in portion 36 and a bottom surface of the radial groove 34, and axial front and rear surfaces of the radial groove 34. The extending portion 30 is thereby fixedly secured to the rigid insert pipe 14 and an air tight seal is provided between the corrugated metal tube 18 and the rigid insert pipe 14 on a portion where the extending portion 30 is fixedly secured to the rigid insert pipe 14.

In this state, the fit-in portion 36 bites in the radial groove 34 in engagement relation with one another, with the extending portion 30 interposed therebetween. The engagement relation between the fit-in portion 36 and the radial groove 34 in this manner secures the extending portion 30 firmly to the rigid insert pipe 14 and concurrently brings about a good seal on a secured portion between the corrugated metal tube 18 and the rigid insert pipe 14.

The fit-in portion 36 is, in this instance, formed by plastic deformation in a shape corresponding to the radial groove 34 when securely compressing or swaging the socket fitting 16 radially inwardly to the hose body 12.

Specifically, as shown in FIG. 2(A), an inner end portion of the base portion 32 of the socket fitting 16 has a wall-thickness of $W_1$.

The wall thickness $W_1$ is designed larger than a value given by subtracting double of a wall thickness t of the extending portion 30 from a width $W_2$ of the radial groove 34.

An inner end portion of the base portion 32 deforms the extending portion 30 in a form of the radial groove 34, and the inner end portion thereof itself is plastic deformed to define the fit-in portion 36, when securely compressing or swaging the socket fitting 16 radially inwardly to the hose body 12. The base portion 32 has lower hardness than the rigid insert pipe 14. As shown in detail in FIG. 2(B), the fit-in portion 36 is thereby in biting engagement with the radial groove 34 with the extending portion 30 interposed therebetween.

The extending portion 30 is firmly clamped by the fit-in portion 36 and the radial groove 34, more specifically, a bottom surface, and front and rear side surfaces of the radial groove 34. Thereby the extending portion 30, namely an end portion of the corrugated metal tube 18 is fixedly secured to the rigid insert pipe 14 and concurrently a tight or air tight seal is thereby provided therebetween.

As a matter of course, by securely compressing or swaging the socket fitting 16, the corrugated metal tube 18, and also outer layer radially outside the tube 18 of the inner elastic layer 20, the reinforced layer 22 and the outer elastic layer 24 are firmly secured to the rigid insert pipe 14. That means, an end portion of the hose body 12 is firmly secured to the rigid insert pipe 14 and the socket fitting 16.

In order to enhance close contact and sealing properties between the corrugated metal tube 18 and the rigid insert pipe 14, adhesive may be applied either one or both of an outer surface of the rigid insert pipe 14 and an inner surface of the straight-walled portion 28 of the corrugated metal tube 18 so as to bond them together. Alternatively, a coating agent, a thin elastomer layer or the like may be applied between an outer surface of the rigid insert pipe 14 and an inner surface of the straight-walled portion 28 of the corrugated metal tube 18 and the both surfaces may be attached each other.

Further, by applying similarly a coating agent, a thin elastomer layer or the like on an outer surface of the straight-walled portion 28 to interpose it therebetween, specifically on an engagement surface with the base portion 32 of the socket fitting 16, a scratch, if any, on a surface of the straight-walled portion 28, is filled in and a sealing property is thereby enhanced. A such thin elastomer layer or thin elastomer section applied on an outer surface of the straight-walled portion 28 may be defined by an elastic layer section adjacent to or radially outside the corrugated metal tube 18, which is defined after stripping the outside of the elastic layer of an end portion of a hose member which is formed of the corrugated metal tube 18 and the elastic layer circumscribing a radial outer side thereof in unitary configuration.

According to the first fastening structure of this example, the fastening structure and sealing structure are easily assembled on an end portion of the hose 10 just by securely compressing or swaging the socket fitting 16 without any other operation such as welding operation of the corrugated metal tube 18 and the rigid insert pipe 14.

And, as weld-bonding operation is not required with respect to the corrugated metal tube 18, it is prevented that strength is lowered in the rigid insert pipe 14 or the corrugated metal tube 18 as a result of weld-bonding operation, and quality assurance of an end portion of the hose 10 is enhanced.

To reiterate, the radial groove 34 is formed on an outer surface of the rigid insert pipe 14 and the fit-in portion 36 is formed on an inner end surface or an inner end side of the base portion 32 of the socket fitting 16 by plastic deformation along the radial groove 34 when securely compressing or swaging the socket fitting 16. And as the fit-in portion 36 and the radial groove 34 in biting engagement relation clamp the extending portion 30, sealing property as well as securing property is enhanced on an end portion of the hose 10.

Figure 3:
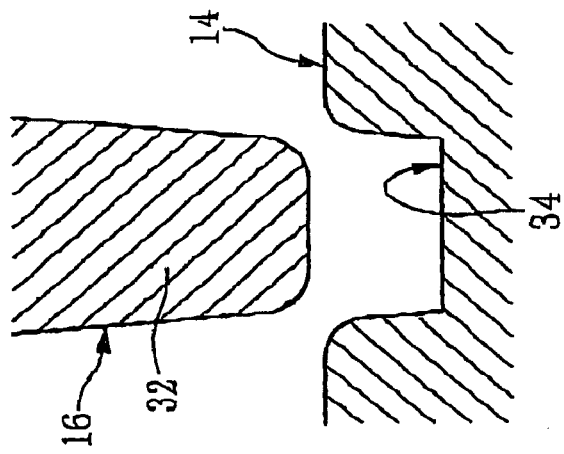
FIG. 3(A) is a cross-sectional view showing a first modification to construction of a radial groove and a fit-in portion in the first fastening structure.
FIG. 3(B) is a cross-sectional view showing a second modification to construction of a radial groove and a fit-in portion in the first fastening structure.
FIG. 3(C) is a cross-sectional view showing a third modification to construction of a radial groove and a fit-in portion in the first fastening structure.
Figure 3:
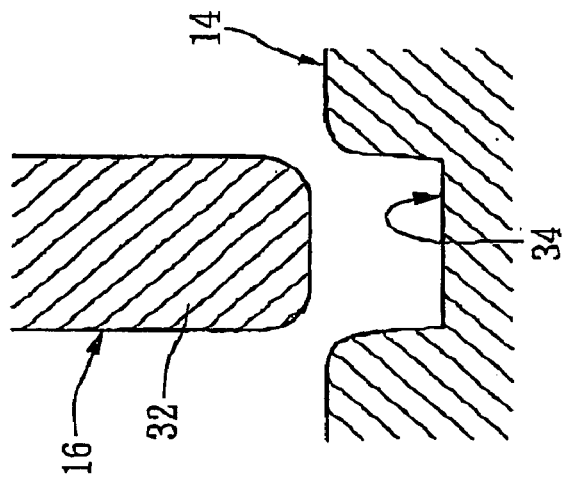
Figure 3:
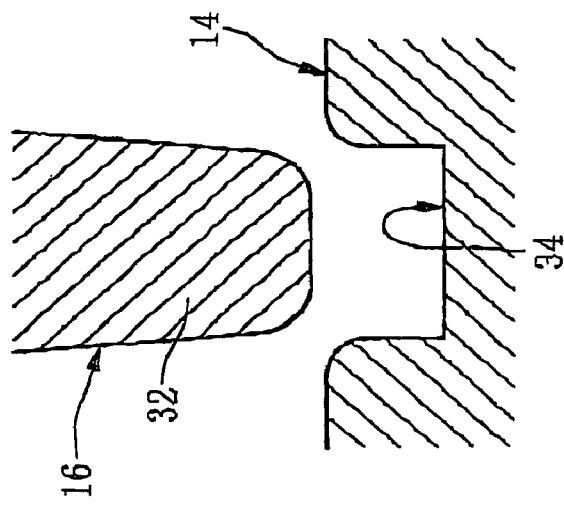

In this embodiment, inner side surfaces or front and rear surfaces of the radial groove 34 and front and rear surfaces of the base portion 32 are formed perpendicular with respect to an axis of the hose 10. However, as shown in FIG. 3(A), front and rear surfaces of the base portion 32 may be formed to be tapered respectively. Further, as shown in FIG. 3(B), front and rear inner surfaces of the radial groove 34 may be formed to be tapered respectively. Alternatively, as shown in FIG. 3(C), inner side surfaces of the groove 34 and front and rear surfaces of the base portion 32 may be formed to be tapered respectively.

In thus configured hose 10, a radially inner end portion of the base portion 32 may be favorably plastic deformed by the radial groove 34 when securely compressing or swaging the socket fitting 16.

FIG. 4(A) shows another or fourth modification to construction of the radial groove 34 and the fit-in portion 36 or the base portion 32 of the hose 10. In this embodiment, a small projection 38 is formed on a bottom surface of the radial groove 34. And, a small recess 40 is formed in a shape corresponding to the small projection 38 on an inner end surface of the base portion 32, which is plastic deformed by bite of the small projection 38 when securely compressing or swaging the socket fitting 16. Then the extending portion 30 is radially clamped in between a bottom surface of the groove 34 including the small projection 38 and an inner end surface of the base portion 32 including the small recess 40 so as to provide securing and sealing property to an end portion of the hose 10.

This construction is the same as the embodiments or instances already described in that the extending portion 30 is deformed in a shape corresponding to the radial groove 34 when securely compressing and swaging the socket fitting 16 and clamped in between the rigid insert pipe 14 and the base portion 32 in this state.

Figure 4:
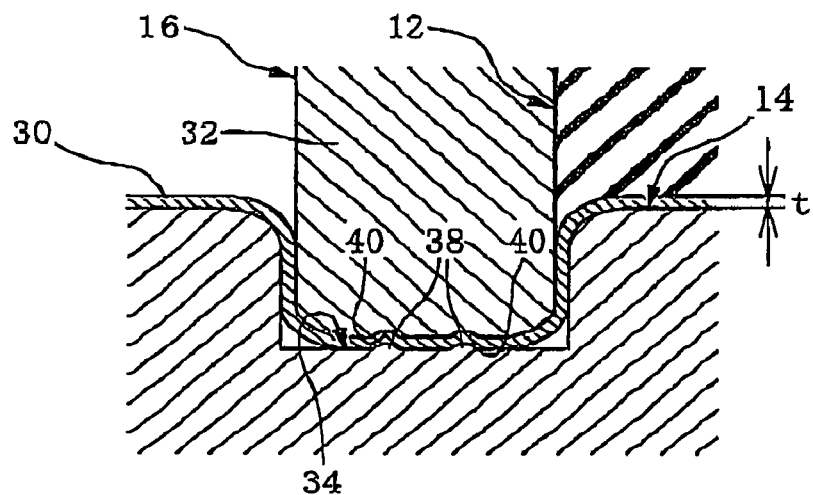
FIG. 4(A) is a cross-sectional view showing a fourth modification to construction of a radial groove and a fit-in portion in the first fastening structure.
FIG. 4(B) is a cross-sectional view showing the radial groove in the fourth modification.
FIG. 4(C) is a cross-sectional view showing a fifth modification to construction of a radial groove and a fit-in portion in the first fastening structure.
Figure 4:
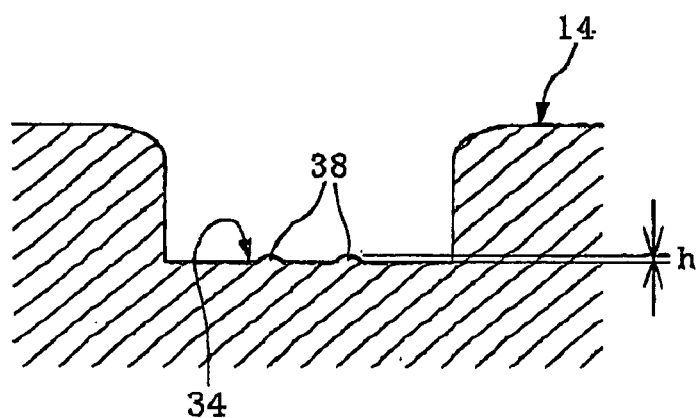
Figure 4:
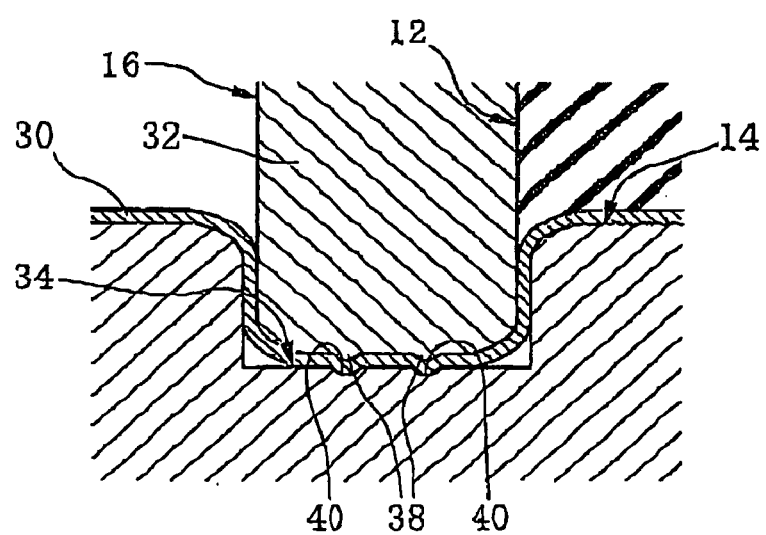

In this embodiment, the small projection 38 is formed with a height h which is designed smaller than a wall thickness t of the extending portion 30. If the height h of the small projection 38 is designed larger than the wall thickness t, the extending portion 30 might be broken by plastic deformation when the extending portion 30 is clamped by the small projection 38 and the small recess 40 during securely compressing or swaging operation. As shown in FIG. 4, the height h designed lower than the wall thickness t helps preventing such inconvenience.

In this embodiment, an inner end portion of the base portion 32 is not necessarily plastic deformed entirely along or corresponding to the radial groove 34 at the time of securely compressing or swaging operation of the socket fitting 16. However, as a matter of course, in some cases, a wall thickness of an inner end portion of the base portion 32 may be designated larger than a value given by subtracting double of a wall thickness t of the extending portion 30 from a width of the radial groove 34 so that an inner end portion of the base portion 32 is plastic deformed along or corresponding to the radial groove 34 at the time of securely compressing or swaging operation.

In this case, the extending portion 30 is clamped under pressure by the radial groove 34 and the base portion 32 also on axial front and rear side surfaces of the radial groove 34.

The embodiment shown in FIG. 4(A) is the same as aforementioned embodiments in that the socket fitting 16 has a hardness lower than the rigid insert pipe 14 having the radial groove 34 and the small projection 38.

FIG. 4(C) shows an embodiment where the small projection 38 is formed on the base portion 32 while the small recess 40 is formed on the radial groove 34. In this instance, the rigid insert pipe 14 has a hardness lower than the socket fitting 16.

The embodiment shown in FIG. 4(C) may exhibit an effect or effects corresponding to the embodiment shown in FIG. 4(A).

Figure 5:
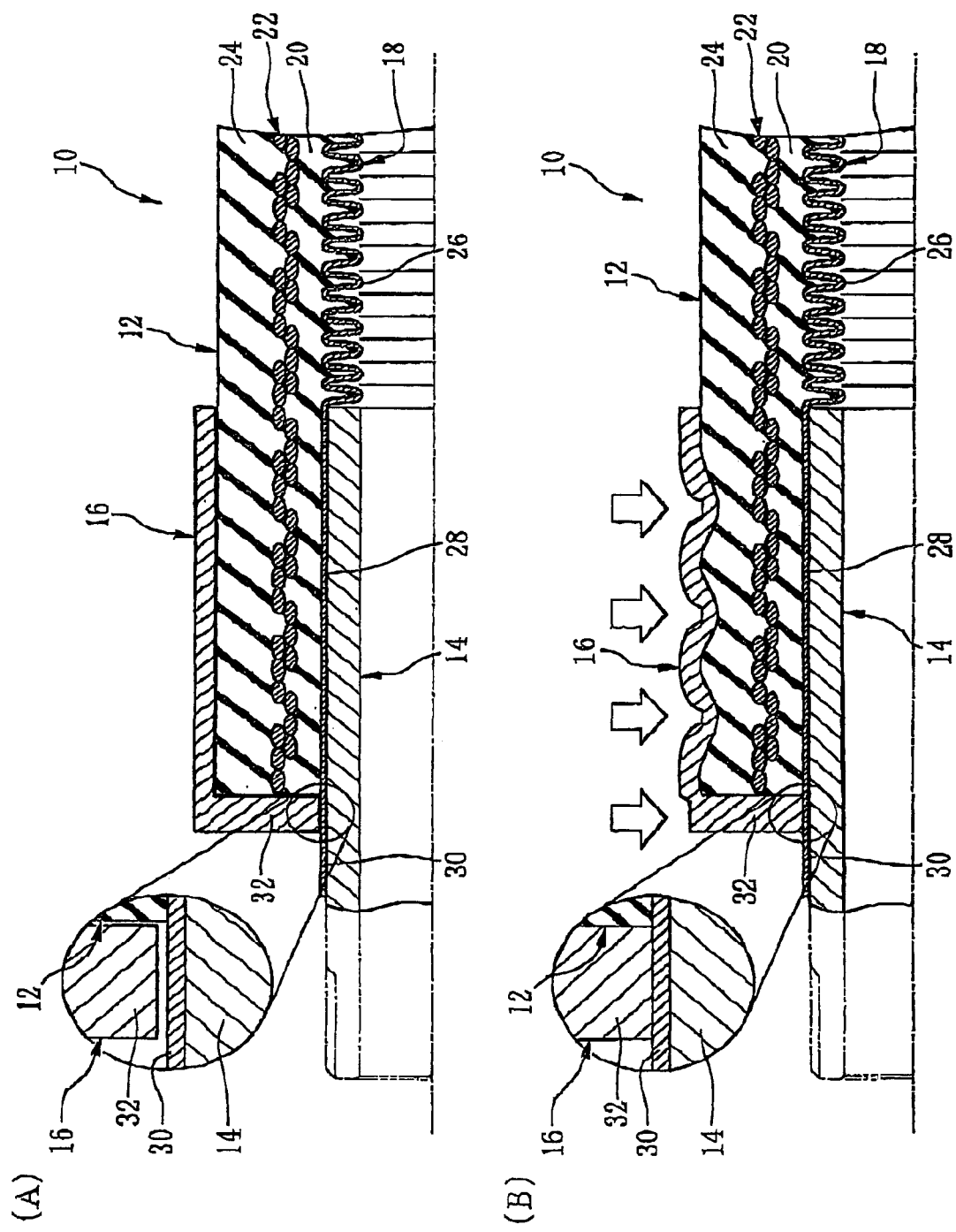
FIG. 5(A) is a cross-sectional view showing another fastening structure assembled on an end portion of the first hose before securely compressing or swaging operation of a socket fitting according to the present invention.
FIG. 5(B) is a cross-sectional view showing another fastening structure assembled on an end portion of the first hose after securely compressing or swaging operation of the socket fitting according to the present invention.

In all above embodiments, the radial groove 34 is formed on the rigid insert pipe 14 and the extending portion 30 of the corrugated metal tube 18 is radially clamped in the radial groove 34 by the rigid insert pipe 14 and the base portion 32 of the socket fitting 16. However, as shown in FIG. 5, the extending portion 30 may be radially clamped only by an outer surface of the rigid insert pipe 14 and an inner end surface of the base portion 32 without forming such radial groove 34 on the rigid insert pipe 14. It is also possible even in this configuration that an end portion of the corrugated metal tube 18 is fixedly secured and sealed.

Alternatively, in some cases, while a groove or radial groove is formed on the base portion 32, a fit-in portion is formed on the rigid insert pipe 14, and the extending portion 30 is clamed radially by the groove or radial groove and the fit-in portion. Thereby an end portion of the hose body 12, including the corrugated metal tube 18, may be fixedly secured and a seal may be provided between the corrugated metal tube 18 and the rigid insert pipe 14.

Figure 6:
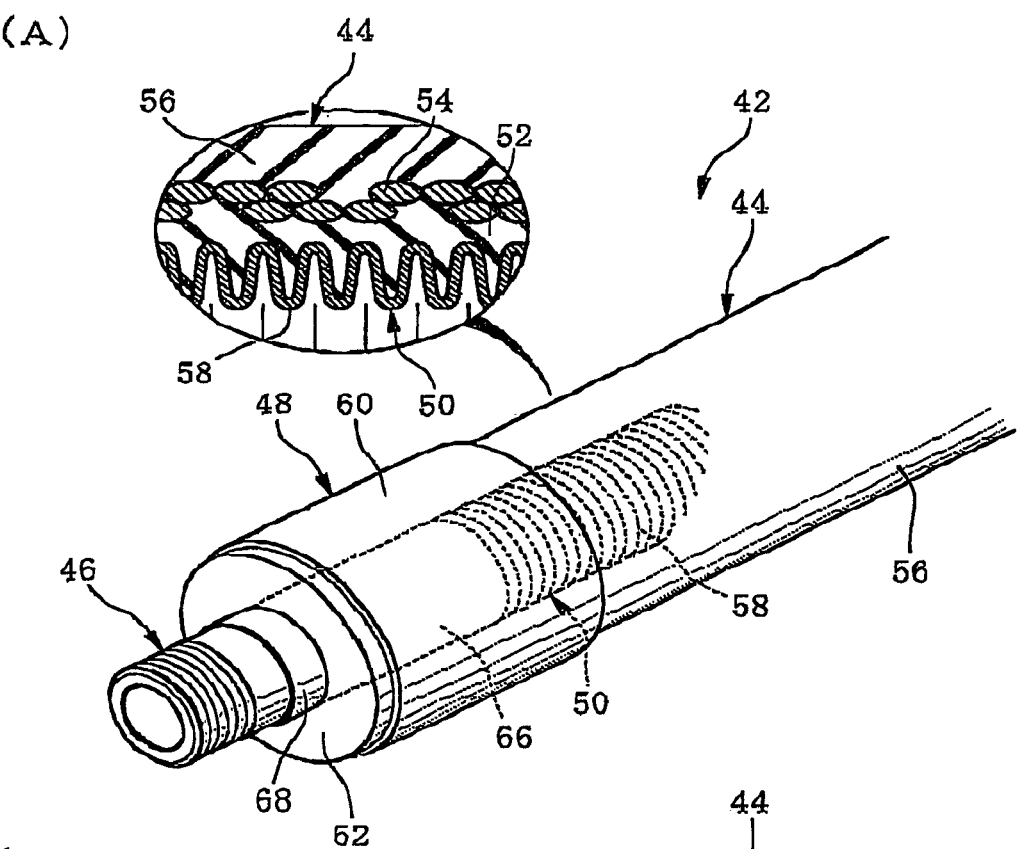
FIG. 6(A) is a perspective view in outline showing a second fastening structure assembled on an end portion of a second hose with corrugated metal tube according to the present invention.
FIG. 6(B) is a perspective view showing multi-layer construction of the second hose.
Figure 6:
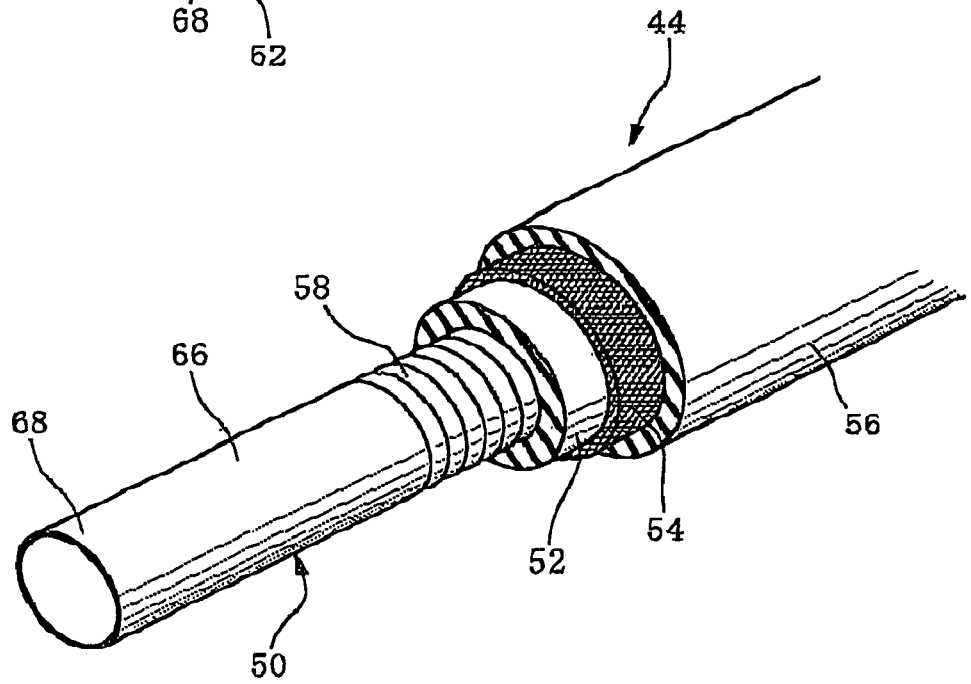
Figure 7:
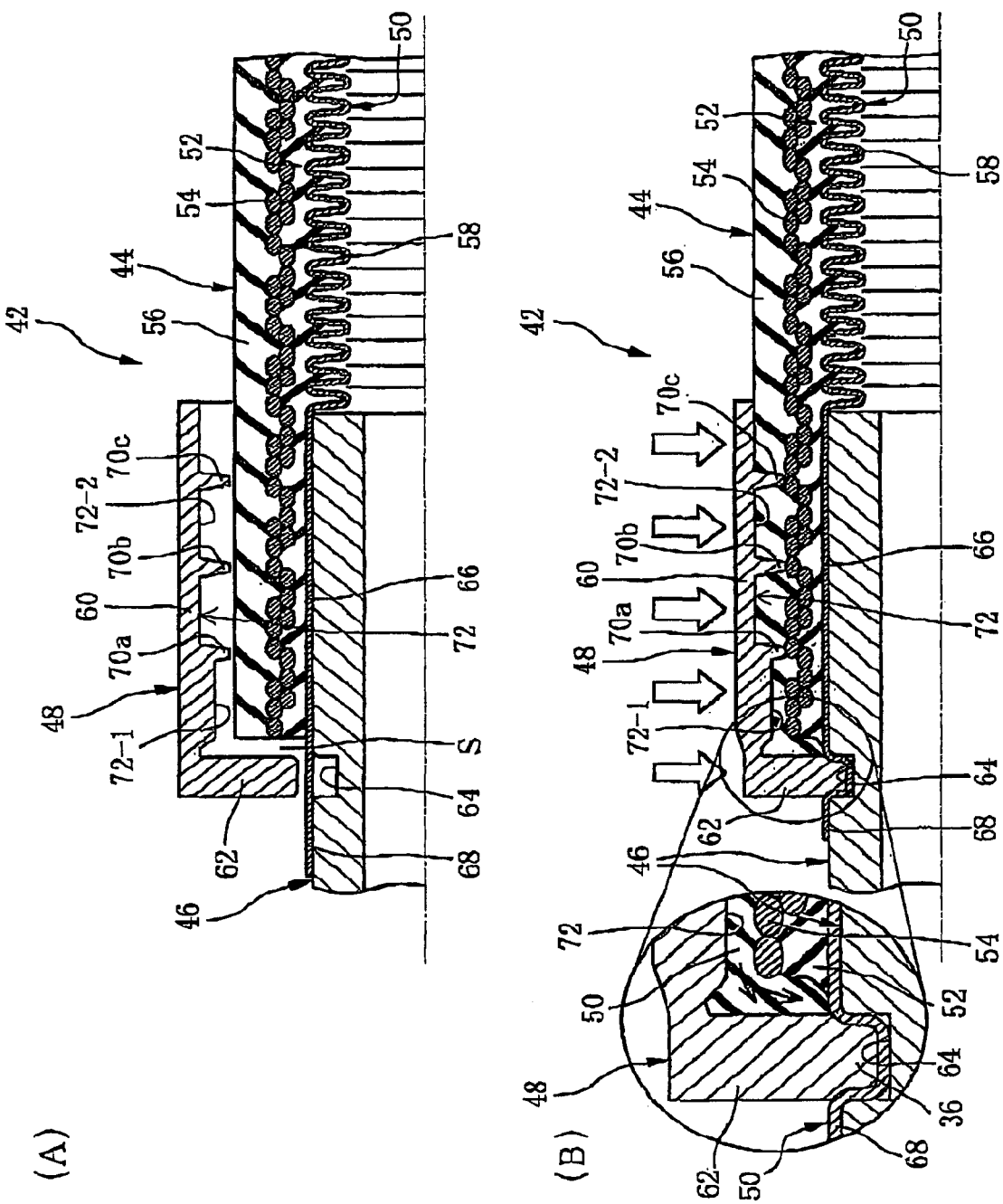
FIG. 7(A) is a cross-sectional view of the second fastening structure before securely compressing or swaging operation of a socket fitting according to the present invention.
FIG. 7(B) is a cross-sectional view of the second fastening structure after securely compressing or swaging operation of the socket fitting according to the present invention.

In FIGS. 6 and 7, a numeral reference 42 indicates a second hose or second composite hose with corrugated metal tube (hereinafter referred to as a hose) which is preferably adapted for hydrogen or hydrogen gas conveying hose, refrigerant conveying hose for air conditioners or automobile fuel conveying hose or the like. In this embodiment, a numeral reference 44 indicates a hose body, a numeral reference 46 a metal connecting part, shaped of pipe in this instance, fixed to the hose body 44, a numeral reference 48 a metal socket fitting fitted onto an outer surface of the hose body 44. The metal connecting part or a rigid metal insert pipe 46 together with the socket fitting 48 are fixedly secured to an axial end portion of the hose body 44 by securely compressing or swaging the socket fitting 48 radially inwardly.

A second fastening structure and sealing structure assembled on an end portion of the hose 42 is specifically illustrated in FIG. 7.

As shown in FIG. 7, the hose body 44 has multi-layers, a corrugated metal tube 50 as innermost layer, an inner rubber layer (inner elastic layer) 52, a wire-reinforced layer (reinforced layer) 54 and an outer rubber layer (outer elastic layer) 56 which are disposed around a radially outer side of the corrugated metal tube 50. Each of the layers is fixedly bonded to an adjacent layer into a composite hose by vulcanizing or other manner.

In this embodiment, the inner rubber layer 52, the wire-reinforced layer 54 and the outer rubber layer 56 construct outer layer circumscribing the corrugated metal tube 50.

The corrugated metal tube 50 is formed with corrugations 58 generally entire axial length thereof, and thereby the corrugated metal tube 50 has flexibility.

That is, although, in this embodiment, the hose 42 includes a metal tube as innermost layer, the hose 42 is provided entirely with flexibility, thanks to the corrugations 58 formed on the metal tube.

The corrugated metal tube 50 may be made of materials such as steel product including stainless steel, copper, copper alloy, aluminum, aluminum alloy, nickel, nickel alloy, titanium or titanium alloy, and preferably may be made of stainless steel (the corrugated metal tube 18 is also the same).

A wall thickness of the corrugated metal tube 50 may be from 20 to 500 μm, preferably is minimum 50 μm in view of preventing defects such as pinholes and further in view of processing of the corrugations 58 or the like, and maximum 300 μm in view of flexibility and durability (a wall thickness of the corrugated metal tube 18 is also the same).

The socket fitting 48 has a sleeve 60 and an inwardly directed collar-like base portion or radially inwardly directed collar-like portion 62 on a base portion of the sleeve 60.

On the other hand, a pipe-shaped connecting part 46 is formed with a fit-in groove or radial groove of an annular shape 64 on a radial outer surface thereof on a position axially corresponding to the collar-like portion 62.

By securely compressing or swaging the socket fitting 48 radially inwardly, an axial end portion of the hose body 44 is fastened radially. And thereby an end portion of the hose body 44 is fixedly secured to the connecting part 46 and the socket fitting 48 in unitary relation.

At that time, as shown in FIG. 7(B), the collar-like portion 62 of the socket fitting 48 is engaged in the fit-in groove 64 of the connecting part 46, and this engaging force between the collar-like portion 62 and the fit-in groove 64 brings about enhanced securing property between the socket fitting 48 and the connecting part 46.

The corrugated metal tube 50 has an axially-straight-walled portion or straight pipe portion 66, along certain length on an axial end side thereof, where the pipe-shaped connecting part 46 is inserted.

An axial leading portion of the straight-walled portion 66 is configured as an extending portion 68 which extends in an axial direction and is exposed as shown in FIG. 7(A), before securely compressing or swaging operation of the socket fitting 48, under the state of a single tube layer out of the outer layer comprising the inner rubber layer 52, the wire-reinforce layer 54 and the outer rubber layer 56. As shown in FIG. 7(B), the extending portion 68 is clamped by the collar-like portion 62 of the socket fitting 48 and the fit-in groove 64, in the fit-in groove 64 by securely compressing or swaging the socket fitting 48. The corrugated metal tube 50 is thereby fixedly secured to the connecting part 46 and a seal is provided between an inner surface of the corrugated metal tube 50 and the connecting part 46.

An inner end portion of the collar-like portion 62 may deform the extending portion 68 in a form of the fit-in groove 64, and the inner end portion thereof itself may be plastic deformed to define the fit-in portion 36, when securely compressing or swaging the socket fitting 48 radially inwardly to the hose body 44. The collar-like portion 62 may have lower hardness than the connecting part 46. As shown in detail in FIG. 7(B), the fit-in portion 36 may be in biting engagement with the fit-in groove 64 with the extending portion 68 interposed therebetween by securely compressing or swaging the socket fitting 48.

The extending portion 68 may be firmly clamped by the fit-in portion 36 and the fit-in groove 64, more specifically, a bottom surface, and front and rear side surfaces of the fit-in groove 64. Thereby the extending portion 68, namely an end portion of the corrugated metal tube 50 may be fixedly secured to the connecting part 46 and concurrently a tight or air tight seal may be thereby provided therebetween.

Relationship, for example dimensional relationship, among the collar-like portion 62 or the fit-in portion 36, the extending portion 68 and the fit-in groove 64 may be the same as the relationship among the base portion 32 or the fit-in portion 36, the extending portion 30 and the radial groove 34.

And, annular projections 70a, 70b and 70c which are raised radially inwardly are formed on an inner surface 72 of the sleeve 60 of the socket fitting 48.

These annular projections 70a, 70b and 70c are shaped of conoid, with relatively sharp angled tip end in cross-section respectively.

The annular projections 70a, 70b and 70c bite into the wire-reinforced layer 54 through the outer rubber layer 56 when securely compressing or swaging the socket fitting 48 as shown in FIG. 7(B). The annular projections 70a, 70b and 70c exert a compressing force or a securing force of the socket fitting 48 on the hose body 44 via the wire-reinforced layer 54, and prevent the hose body 44 from being pulled out of the socket fitting 48 and the connecting part 46.

That means, by biting into the wire-reinforced layer 54, the annular projections 70a, 70b and 70c effectively enhance pull-out resistance of the hose body 44.

In this embodiment, a filler layer is defined by a part of the outer rubber layer 56 located inside the socket fitting 48 or in an inner surface side of the sleeve 60. As shown in FIG. 7(A), a gap S is defined between a tip end portion of outer layer of the hose body 44 and the collar-like portion 62 of the socket fitting 48 before securely compressing or swaging operation of the socket fitting 48. When securely compressing or swaging the socket fitting 48, the filler layer, i.e. a part of the outer rubber layer 56 is deformed compressively, urged into the gap S under compression force by the socket fitting 48 and fills in the gap S.

At that time, the annular projections 70a, 70b and 70c, specifically the annular projection 70a adjacent to or nearest the collar-like portion 62 act to restrain a portion of the outer rubber layer 56 located inside of the socket fitting 48, i.e. a portion as filler layer from deforming and escaping in a direction away from the collar-like portion 62.

In this embodiment, in the sleeve 60 of the socket fitting 48, a portion between the collar-like portion 62 and the annular projection 70a is designed thicker walled than the rest of the sleeve 60 before securely compressing or swaging operation. In other words, an inner diameter of an inner surface 72-1 between the collar-like portion 62 and the annular projection 70a, namely an inner diameter of an inner surface 72-1 of a portion adjacent to the collar-like portion 62 is designed smaller than that of an inner-surface 72-2 of the rest in the sleeve 60.

In case of the sealing structure for an end of the hose with corrugated metal tube, even if the gap S is defined between a tip end of the outer layer of the hose body 44 and the collar-like portion 62 before securely compressing or swaging operation of the socket fitting 48, a portion of the outer rubber layer 56 located in inner surface side of the sleeve 60, namely a portion as filler layer is deformed under compression force, urged in the gap S, and fills in the gap S at the time of securely compressing or swaging operation of the socket fitting 48 as shown in FIG. 7(B).

In this state, the outer rubber layer 56 which fills in the gap S bears from radially outside the extending portion 68 of the corrugated metal tube 50 which extends and is exposed out of the outer layer under the state of a single tube layer. Therefore, if internal fluid exerts a pressure to the extending portion 68, it is favorably prevented that the extending portion 68 swells or bursts in the gap S due to internal pressure. Thereby pressure resistance of the hose 42 is enhanced, and consequently service life thereof is improved.

And, in this embodiment, as an inner diameter of the inner surface 72-1 of a portion adjacent to the collar-like portion 62 is designed smaller than that of the inner surface 72-2 of the rest of the portion in the sleeve 60 of the socket fitting 48, a portion of the filler layer or the outer rubber layer 56 adjacent to the collar-like portion 62 may be effectively urged and fills in the gap S when securely compressing or swaging the socket fitting 48.

In this embodiment, the radially inwardly raised annular projections 70a, 70b and 70c are provided on the inner surface 72 of the sleeve 60 of the socket fitting 48. Therefore, even in case that the outer rubber layer 56 is disposed as filler layer in an inner side of the sleeve 60, a compressing force or securing force applied by the socket fitting 48 swaged may be favorably exerted on the hose body 44 as the annular projections 70a, 70b and 70c bite into the wire-reinforced layer 56 in engagement relation. This provides the hose body 44 with sufficiently high pull-out resistance with respect to the socket fitting 48 and the connecting part 46.

And, in this embodiment, the annular projection 70a on a position near the collar-like portion 62 of the socket fitting 48 may restrain the outer rubber layer 56 as filler layer from deforming and escaping in a direction away from the collar-like portion 62 when securely compressing or swaging the socket fitting 48. Thereby the outer rubber layer 56 is favorably urged into the gap S and fills in the gap S effectively.

Figure 8:
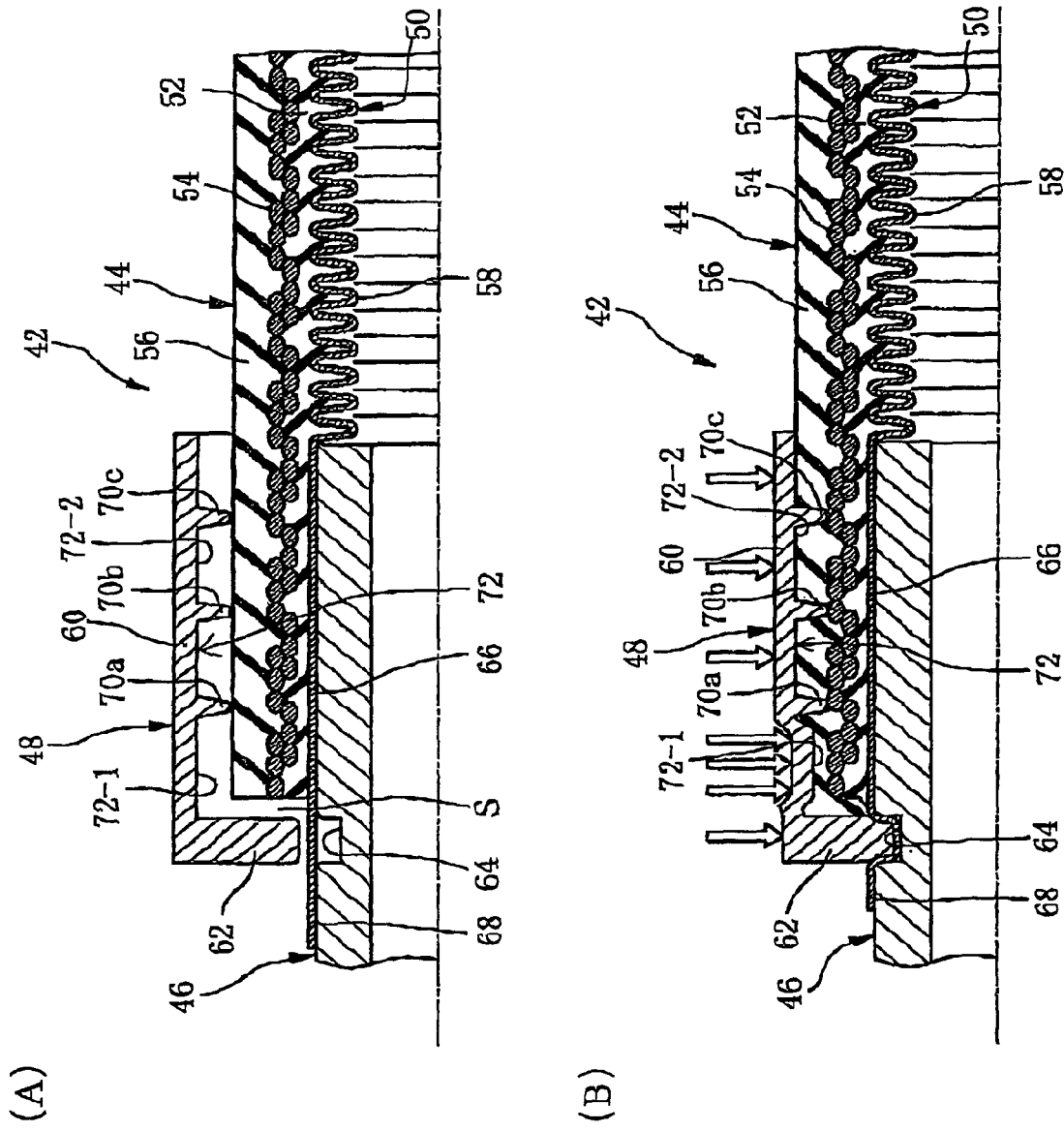
FIG. 8(A) is a cross-sectional view showing another construction of a socket fitting in the second fastening structure before securely compressing or swaging operation of a socket fitting.
FIG. 8(B) is a cross-sectional view showing another construction of the socket fitting in the second fastening structure after securely compressing or swaging operation of the socket fitting.

FIG. 8 shows another construction of a socket fitting in the second fastening structure.

In this embodiment, at the time of swaging operation of the socket fitting 48, a portion of the sleeve 60 between the collar-like portion 62 and the annular projection 70a is securely compressed or swaged under higher pressure or so as to reduce a diameter thereof more compared to the rest part in the sleeve 60. Therefore, an inner diameter of the inner surface 72-1 is consequently smaller than the rest part 72-2 in the sleeve 60 after swaging operation.

In this embodiment, the outer rubber layer 56 as filler layer may be also compressed under high pressure, deformed, urged in the gap S, and fills in the gap S.

Figure 9:
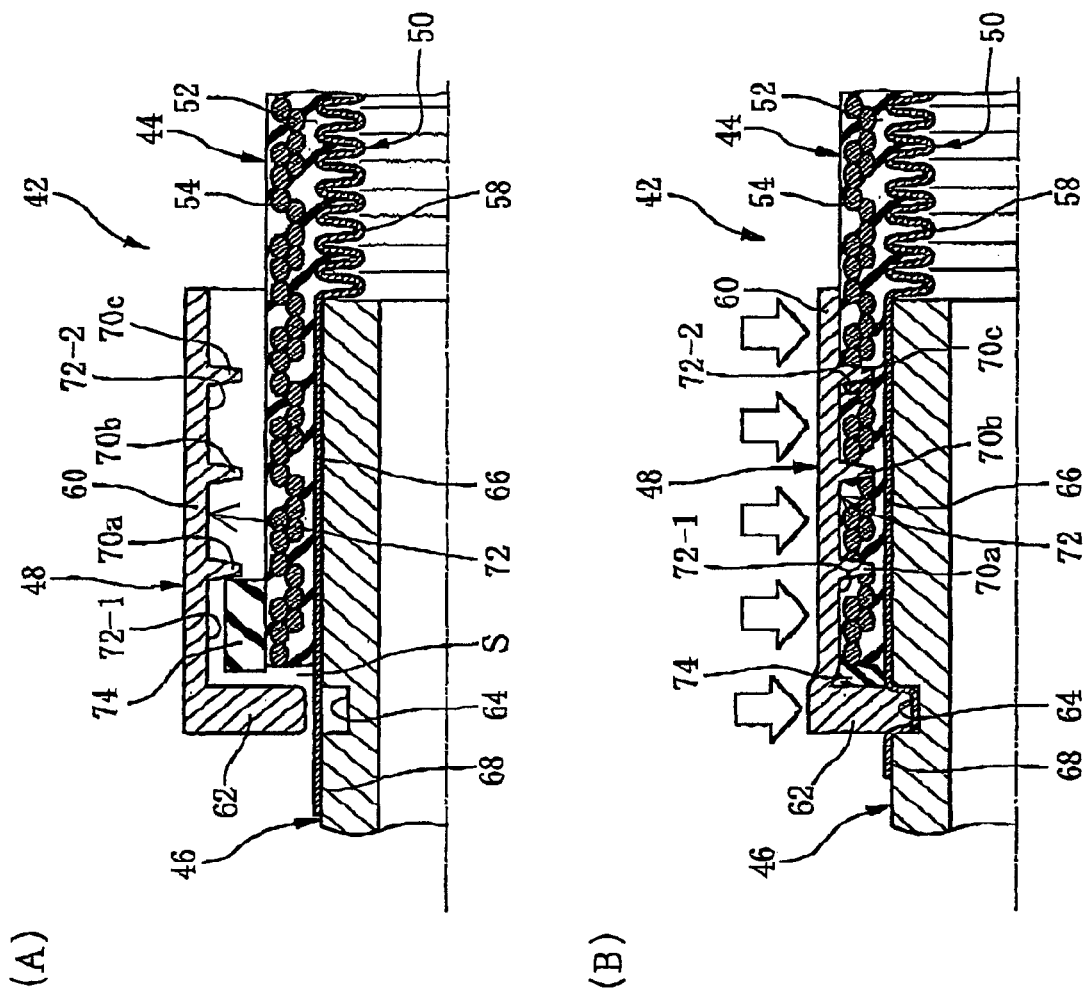
FIG. 9(A) is a cross-sectional view showing another construction of a filler layer in the second fastening structure before securely compressing or swaging operation of a socket fitting.
FIG. 9(B) is a cross-sectional view showing another construction of the filler layer in the second fastening structure after securely compressing or swaging operation of the socket fitting.
Figure 10:
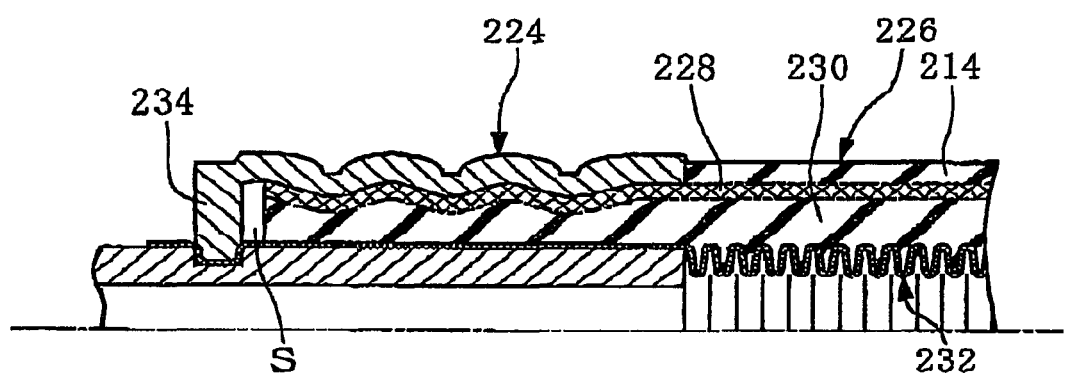
FIG. 10 is an explanatory view showing a gap in a fastening structure assembled on an end portion of the hose with corrugated metal tube.
Figure 11:
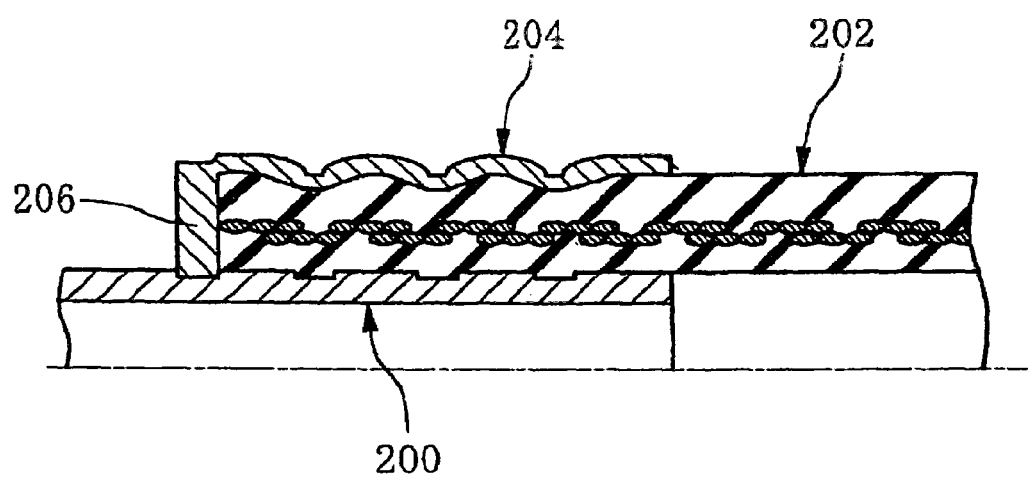
FIG. 11 is an explanatory view to understand the back ground of the present invention.
Figure 12:
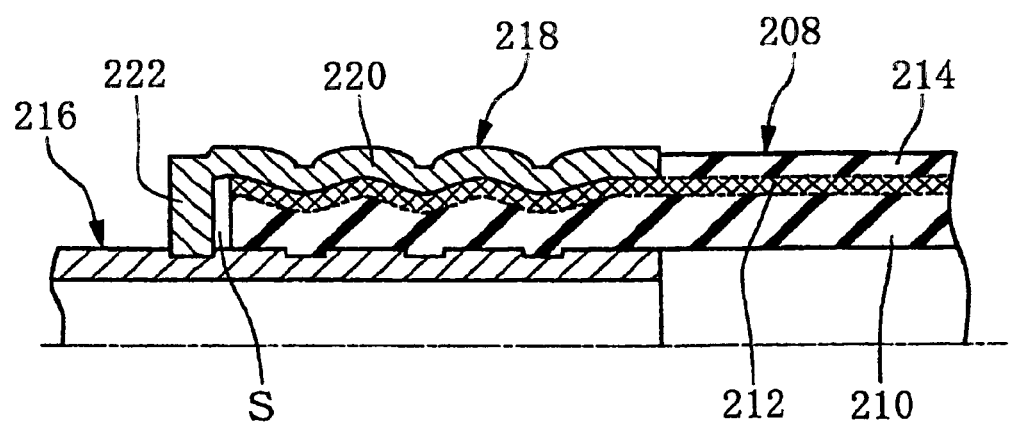
FIG. 12 is another explanatory view to understand the back ground of the present invention.

FIG. 9 shows another construction of a filler layer in the second fastening structure.

In this embodiment, the outer rubber layer 56 is eliminated on an end portion of the hose 42, or eliminated entire length of the hose 42. Corresponding to eliminating the outer rubber layer 56, a filler layer or a layer of filler material 74 is disposed in an inner surface side of the sleeve 60 of the socket fitting 48, specifically between the collar-like portion 62 and the annular projection 70a. By securely compressing or swaging the socket fitting 48, the filler layer 74 is compressed, deformed, urged in the gap S and fills in the gap S.

Although the preferred embodiments have been described above, these are only some of embodiments of the present invention.

In the above embodiments, the connecting part 46 is shaped of pipe, the extending portion 68 of the corrugated metal tube 50 is clamped in between an outer surface of the connecting part 46 and the collar-like portion 62 of the socket fitting 48, and thereby an end portion of the hose 42 is fixedly secured and sealed. However, for example, depending on circumstances, the extending portion 68 may be fixedly secured to the connecting part 46 and sealed with respect thereto in different manner. The connecting part 46 may be same as in the above embodiment or may be different in configuration.

The present invention has been described in terms of preferred embodiments. However, those skilled in the art will recognize that many variations of such embodiments exist. For example, the present invention may be adapted for various type of fluid conveying hose, other than the above embodiments. Such variations are intended to be within the scope of the present invention and the following claims.

We claim:

1. A fastening structure, assembled on an end portion of a hose with a corrugated metal tube, for securely fastening an axial end portion of a hose body, a rigid insert pipe and a socket fitting in unitary relation, comprising:
   a hose body constructed in multi-layers having a corrugated metal tube as an inner layer and an outer layer including an elastic layer circumscribing a radial outer side of the hose body,
   a rigid insert pipe inserted in an axial end portion of the hose body, and
   a socket fitting fitted on an outer surface of the hose body at an axial end portion thereof, and compressed or swaged radially inwardly to be secured to the axial end portion of the hose body in which the rigid insert pipe is inserted, the socket fitting having an inwardly directed collar-like base portion,
   an axial leading portion of the corrugated metal tube being configured as an extending portion extending and exposed out of the outer layer of the hose body, extending at least to a position of a tip end of the inwardly directed collar-like base portion.

2. A fastening structure assembled on an end portion of a hose with a corrugated metal tube as set forth in claim 1 wherein the extending portion of the corrugated metal tube is not corrugated, and of generally axially straight-walled shape, and extends axially outwardly beyond the inwardly directed collar-like base portion of the socket fitting.

3. A fastening structure assembled on an end portion of a hose with a corrugated metal tube as set forth in claim 1 wherein the hose body, the rigid insert pipe and the socket fitting are securely fastened in unitary relation so that the extending portion of the corrugated metal tube is clamped in between an inner end surface of the inwardly directed collar-like base portion of the socket fitting and an outer surface of the rigid insert pipe by securely compressing or swaging the socket fitting to the axial end portion of the hose body thereby providing a tight seal between the corrugated metal tube and the rigid insert pipe.

4. A fastening structure assembled on an end portion of a hose with a corrugated metal tube as set forth in claim 3, further comprising, a radial groove formed on either one of the outer surface of the rigid insert pipe or the inner end surface of the inwardly directed collar-like base portion of the socket fitting, and
   a fit-in portion is formed on the other to fit in the radial groove,
   the extending portion of the corrugated metal tube being clamped in between the fit-in portion and the radial groove.

5. A fastening structure assembled on an end portion of a hose with a corrugated metal tube as set forth in claim 4, wherein the fit-in portion is formed by plastic deformation along the radial groove when securely compressing or swaging the socket fitting to the axial end portion of the hose body, and bites in the radial groove in engaging relation with the extending portion which is clamped in between the fit-in portion and the radial groove, at a bottom surface and axial front and rear side surfaces of the radial groove.

6. A fastening structure assembled on an end portion of a hose with a corrugated metal tube as set forth in claim 5 wherein the radial groove is formed on the outer surface of the rigid insert pipe, the fit-in portion is formed by plastic deformation of the radially inner end porton of the inwardly directed collar-like base portion of the socket fitting when securely compressing or swaging the socket fitting to the axial end portion of the hose body, and a wall thickness of the radially inner end portion of the base portion of the socket fitting is, before securely compressing or swaging the socket fitting, designed at least larger than a value given by subtracting double of a wall thickness of the extending portion from a width of the radial groove.

7. A fastening structure assembled on an end portion of a hose with a corrugated metal tube as set forth in claim 3, further comprising: a small projection formed raised radially on either one of the outer surface of the rigid insert pipe or the inner end surface of the base portion of the socket fitting,
   a small recess formed on the other by plastic deformation under biting of the small projection when securely compressing or swaging the socket fitting to the axial end portion of the hose body, the extending portion being clamped by the small projection and the small recess.

8. A fastening structure, assembled on an end portion of a hose with a corrugated metal tube, for securely fastening an axial end portion of a hose body to a connecting part, comprising:
   a hose body constructed in multi-layers having a corrugated metal tube as an inner layer and an outer layer circumscribing the radial outer side of the corrugated metal tube, an axial end side of the corrugated metal tube being configured as an extending portion extending and exposed out of the outer layer of the hose body,
   a connecting part inserted in an axial end portion of the hose body,
   a socket fitting having a sleeve and a radially inwardly directed collar-like portion formed on a base portion thereof, and fitted onto the axial end portion of the hose body and securely compressed or swaged radially inwardly to the axial end portion of the hose body so as to fixedly secure the extending portion of the corrugated metal tube to the connecting part and to thereby fasten the axial end portion of the hose body to the connecting part, and
   a filler layer interposed in an inner surface side of the sleeve of the socket fitting, and deformed and moved under fastening force exerted by the socket fitting when securely compressing or swaging the socket fitting, the filler layer being urged in a gap defined on a tip end of the outer layer, the gap being filled by compressing or swaging the socket fitting, and bearing against the outside of the extending portion of the corrugated metal tube.

9. A fastening structure assembled on an end portion of a hose with a corrugated metal tube as set forth in claim 8 wherein the gap is defined between the tip end of the outer layer and the collar-like portion of the socket fitting.

10. A fastening structure assembled on an end portion of a hose with a corrugated metal tube as set forth in claim 8 wherein the outer layer has a reinforced layer between an inner elastic layer and an outer elastic layer.

11. A fastening structure assembled on an end portion of a hose with a corrugated metal tube as set forth in claim 10 wherein the filler layer is defined by a part of the elastic outer layer of the outer layer located in the inner surface side of the sleeve of the socket fitting.

12. A fastening structure assembled on an end portion of a hose with a corrugated metal tube as set forth in claim 8 wherein an inner diameter of a portion adjacent to the collar-like portion of the sleeve is smaller than another portion of the sleeve of the socket fitting after securely compressing or swaging the socket fitting.

13. A fastening structure assembied on an end portion of a hose with a corrugated metal tube as set forth in claim 10 wherein a projection raised radially inwardly is formed on the inner surface of the sleeve of the socket fitting and the projection bites in the reinforced layer when securely compressing or swaging the socket fitting.

14. A fastening structure assembled on an end portion of a hose with a corrugated metal tube as set forth in claim 8 wherein an inwardly directed annular projection is formed on the inner surface of the sleeve of the socket fitting at a position near the collar-like portion thereof to restrain the filler layer from deforming and escaping in a direction away from the collar-like portion thereof when securely compressing or swaging the socket fitting.

\* \* \* \* \*